Feb. 13, 1962   C. R. TAYLOR ETAL   3,020,837
PHOTOGRAPHIC COPYING APPARATUS
Filed May 28, 1959   13 Sheets-Sheet 2

CLARENCE R. TAYLOR
WILLIAM C. WILSON
INVENTORS

BY
ATTORNEYS

Feb. 13, 1962     C. R. TAYLOR ETAL     3,020,837
PHOTOGRAPHIC COPYING APPARATUS
Filed May 28, 1959     13 Sheets-Sheet 6

CLARENCE R. TAYLOR
WILLIAM C. WILSON
INVENTORS

ATTORNEYS

CLARENCE R. TAYLOR
WILLIAM C. WILSON
INVENTORS

BY R. Frank Smith
Steve W. Grumbau
ATTORNEYS

Feb. 13, 1962 C. R. TAYLOR ETAL 3,020,837
PHOTOGRAPHIC COPYING APPARATUS
Filed May 28, 1959 13 Sheets-Sheet 8

CLARECNE R. TAYLOR
WILLIAM C. WILSON
INVENTORS

BY R. Frank Smith

Stan W. Grumbein

ATTORNEYS

Feb. 13, 1962  C. R. TAYLOR ETAL  3,020,837
PHOTOGRAPHIC COPYING APPARATUS
Filed May 28, 1959  13 Sheets-Sheet 9

CLARENCE R. TAYLOR
WILLIAM C. WILSON
INVENTORS

BY *R. Frank Smith*
*Steve W. Grembaw*
ATTORNEYS

Feb. 13, 1962     C. R. TAYLOR ETAL     3,020,837
PHOTOGRAPHIC COPYING APPARATUS
Filed May 28, 1959                         13 Sheets-Sheet 10

CLARENCE R. TAYLOR
WILLIAM C. WILSON
INVENTOR.

BY

ATTORNEYS

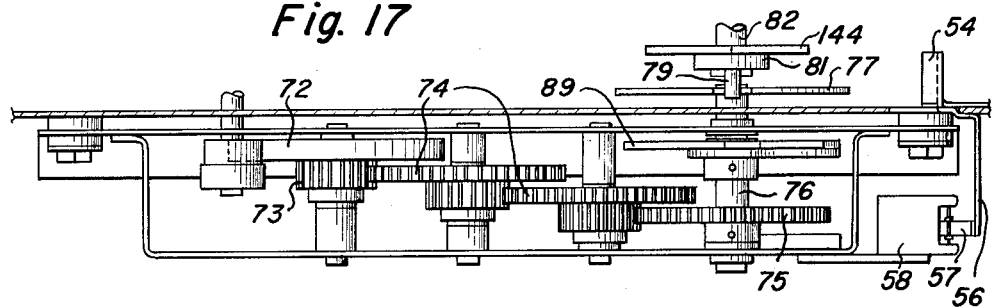
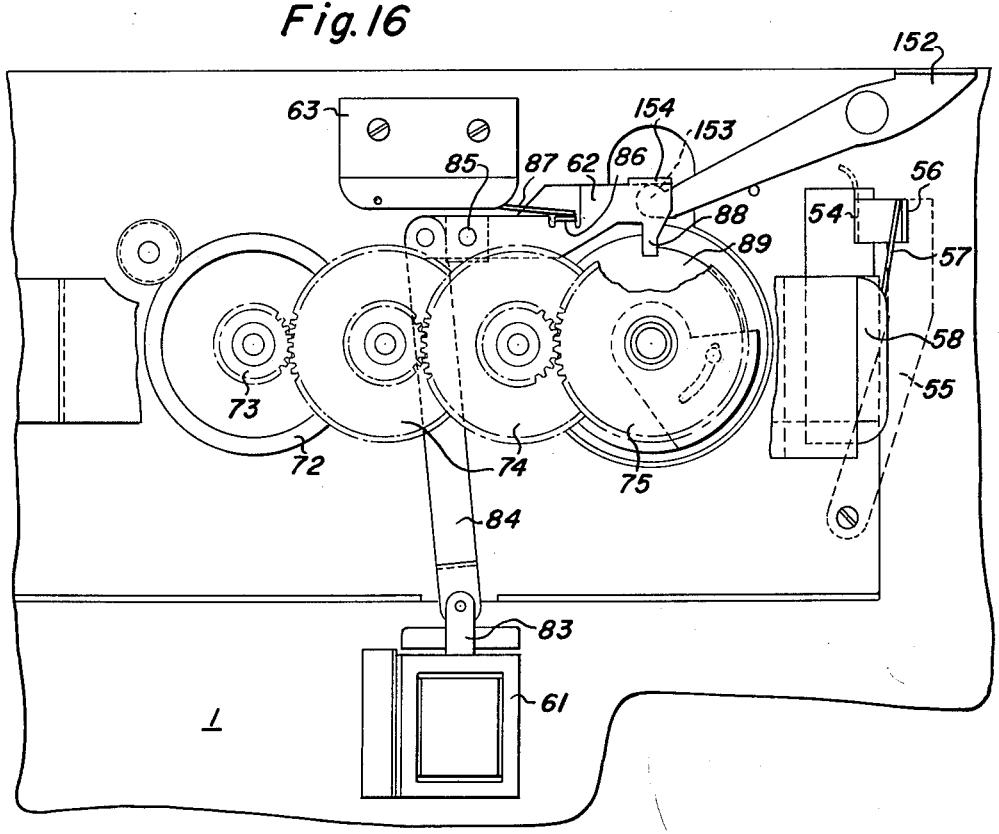

Feb. 13, 1962 C. R. TAYLOR ETAL 3,020,837
PHOTOGRAPHIC COPYING APPARATUS
Filed May 28, 1959 13 Sheets-Sheet 12

CLARENCE R TAYLOR
WILLIAM C. WILSON
INVENTORS

BY R. Frank Smith

Steve W. Grembow
ATTORNEYS

Feb. 13, 1962 C. R. TAYLOR ETAL 3,020,837
PHOTOGRAPHIC COPYING APPARATUS
Filed May 28, 1959 13 Sheets-Sheet 13

CLARENCE R. TAYLOR
WILLIAM C. WILSON
INVENTORS

BY R. Frank Smith
Steve W. Greenbaum
ATTORNEYS

United States Patent Office 3,020,837
Patented Feb. 13, 1962

3,020,837
PHOTOGRAPHIC COPYING APPARATUS
Clarence R. Taylor and William C. Wilson, Rochester, N.Y., assignors to Eastman Kodak Company, Rochester, N.Y., a corporation of New Jersey
Filed May 28, 1959, Ser. No. 816,639
21 Claims. (Cl. 101—132.5)

This invention relates generally to photographic reproduction, and more specifically to an automatic photographic processing and image-transfer copying apparatus.

Photographic processing and image-transfer copying devices for processing an exposed sensitized photographic sheet in a suitable liquid, and placing the sheet in intimate contact with a copy sheet which is nonsensitized to cause transfer of an image from the photographic sheet to the copy sheet are well known in the art. A device of this type is specifically disclosed in U.S. Patent No. 2,666,384. The principle upon which this type of apparatus operates is disclosed in U.S. Patent No. 2,596,756, in which a film or paper support, coated with a substantially unhardened silver halide gelatin emulsion containing a pigment or dye and a tanning developing agent, is exposed to a suitable two-tone subject, such as a line or half-tone subject, after which the sensitized film or paper is processed by immersion in an alkaline solution. This processing results in the developing of the exposed image, and the simultaneous hardening or tanning of the gelatin in the exposed and developed areas. Thereafter, the excess fluid may be squeegeed from the processed sheet which is then pressed, while still moist, into contact with a nonsensitized sheet of paper having an absorbent surface. After separation of the sheets, it will be found that a stratum of the unexposed and, therefore, unhardened areas of emulsion layer will have been transferred to the sheet of paper. This process thus produces a direct positive image. Moreover, although the image is immediately discernible upon separation of the two sheets because of the pigment or dye in the transferred emulsion, this image will darken further upon exposure to light since the transferred emulsion also contains sensitized silver halide.

This process is especially useful since it permits making several reproductions from the exposure of a single sensitized sheet. This is possible because in the transfer of unhardened gelatin to the absorbent sheet, only a stratum thereof is carried over. The processed sheet may be again wetted in the alkaline solution, squeegeed and pressed against a second absorbent sheet whereby a second stratum of the unhardened gelatin will be transferred. It is possible to repeat this a number of times before the unhardened gelatin is exhausted to the extent that acceptable copies are no longer obtainable.

Since the composition of the emulsion, as well as a number of modifications thereof, and the chemistry of this process are fully disclosed in the above-noted patent and actually form no part of the present invention. We have omitted such data in the specification. We refer to this process, however, in that the apparatus disclosed below, which comprises the present invention, is particularly adapted for use in this process and in such variations thereof as may occur to those skilled in this art.

Photographic processing and image transfer devices of the type described provide only the basic essentials for transferring an image from a matrix master to a nonsensitized copy sheet; namely, a tray containing activator solution into which the exposed matrix is inserted and developed, a separate container for holding and positioning the copy paper, and a simple, manually operable mechanism for squeegeeing the excess solution from the matrix and immediately thereafter pressing the matrix into intimate contact with the image-receiving copy sheet. It is necessary in this type of device for the operator to insert the exposed matrix into the activator tray, time the development, manually pull out the matrix after developed along with a piece of copy paper, manually strip the two apart, end reinsert the matrix into the activator and repeat the cycle for as many copies as he requires or for as long as the matrix lasts. It is also necessary for the operator to trim a tab which is about an inch and a half long off of each copy sheet to produce the final copy. The tab is necessary since a portion of the matrix and the copy sheet are kept out of the activator solution to facilitate handling of the matrix and copy paper by the operator.

The apparatus embodying the present invention automatically performs most of the functions indicated in the preceding paragraph with the exception of the initial insertion of the matrix into the activator tray. The proposed apparatus automatically times the development of the matrix and then positions it on the copy drum, automatically produces a copy when the operator manually actuates a hand feeder to feed a copy sheet into the apparatus and ejects the finished copies into a receiving tray, and automatically ejects the old matrix from the drum and picks up a new matrix. The apparatus produces more copy sheets at a considerably faster rate than possible with the prior-known photographic copying machines. In addition, the copy sheets are not provided with tabs, and therefore the necessity for trimming a tab off of the copy sheets is eliminated.

Therefore, one of the primary objects of this invention is to provide a new and improved automatic photographic copying apparatus.

Another object of this invention is to provide a new and improved processing and image-transfer apparatus which is adapted to produce a plurality of copies from an exposed sensitized sheet.

One more object of this invention is to provide an apparatus of the character described in which the copy sheets used therein have the same dimensions as the original to which the matrix is exposed, thereby making it unnecessary to trim off a tab from the finished copy sheet.

Still another object of this invention is to provide an improved photographic copying apparatus that automatically times the development of the matrix, and then positions the matrix on the copy drum.

An additional object of this invention is to provide an improved photographic copying apparatus composed of a plurality of removable components for facilitating assembly and repair.

Still another object of this invention is to provide an improved photographic copying apparatus having a novel discharge chute arrangement for directing the finished copies and the discarded matrix into different receptacles.

Another object of this invention is to provide an automatic photographic copying apparatus adapted to produce a larger number of copies from a single matrix than prior-known machines.

Still another object of this invention is to provide an improved photographic copying apparatus that automatically ejects the used matrix from the drum, and picks up and positions a new matrix thereon in a single operation.

One more object of this invention is to provide an automatic photographic copying apparatus having a mechanism actuable by the leading edge of a copy sheet to simultaneously release a pressure roller which urges the copy paper into contact with the matrix, and initiates rotation of the drum.

And still another object of this invention is to provide an improved automatic photographic copying apparatus having a novel matrix pick-up mechanism for automatically gripping and positioning the matrix upon the drum.

A still further object of this invention is to provide an automatic photographic copying apparatus having a novel matrix pick-up mechanism that is manually movable from an inoperative position to an operative position, and released from the operative position by the drum.

An additional object of this invention is to provide an automatic photographic copying apparatus of simple design and construction, thoroughly reliable and efficient in operation, and economical to manufacture.

Objects and advantages other than those set forth above will be apparent from the following description when read in connection with the accompanying drawings, in which:

FIG. 16 is a segmental side elevation view of a portion of the apparatus of FIG. 4 showing the drum drive mechanism including a gear train with the drum in a stopped position;

FIG. 17 is a top plan view of the structure of FIG. 16;

Figure 4:
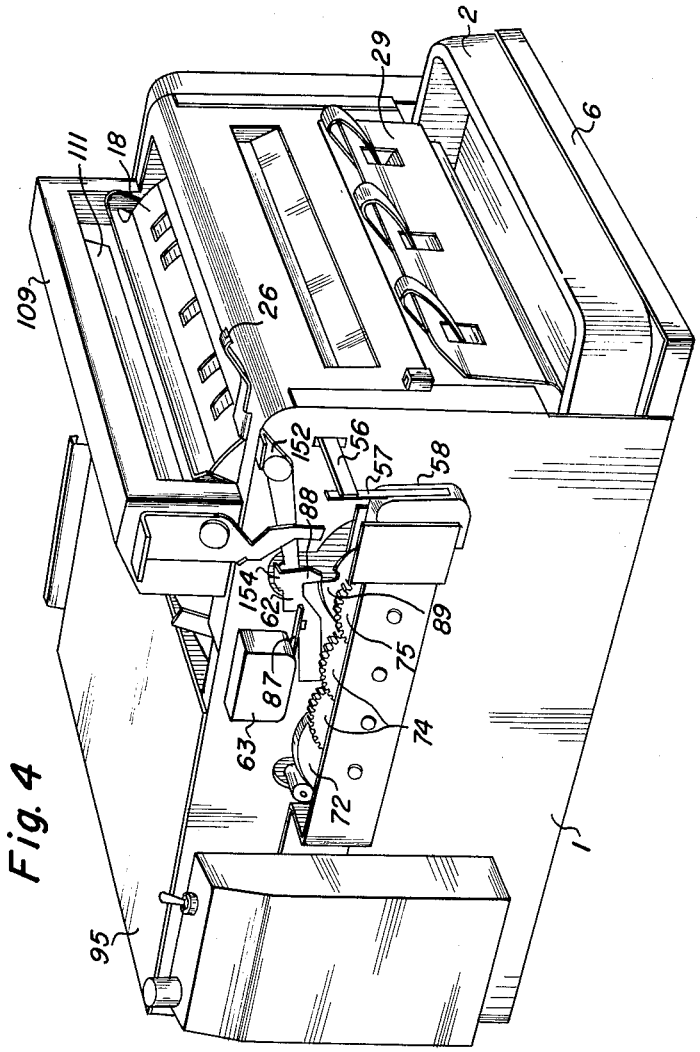
FIG. 4 is a perspective view of a portion of the apparatus of FIG. 1 with a side cover removed therefrom exposing the timing system, gear train, and some microswitches in addition to other parts.
Figure 5:
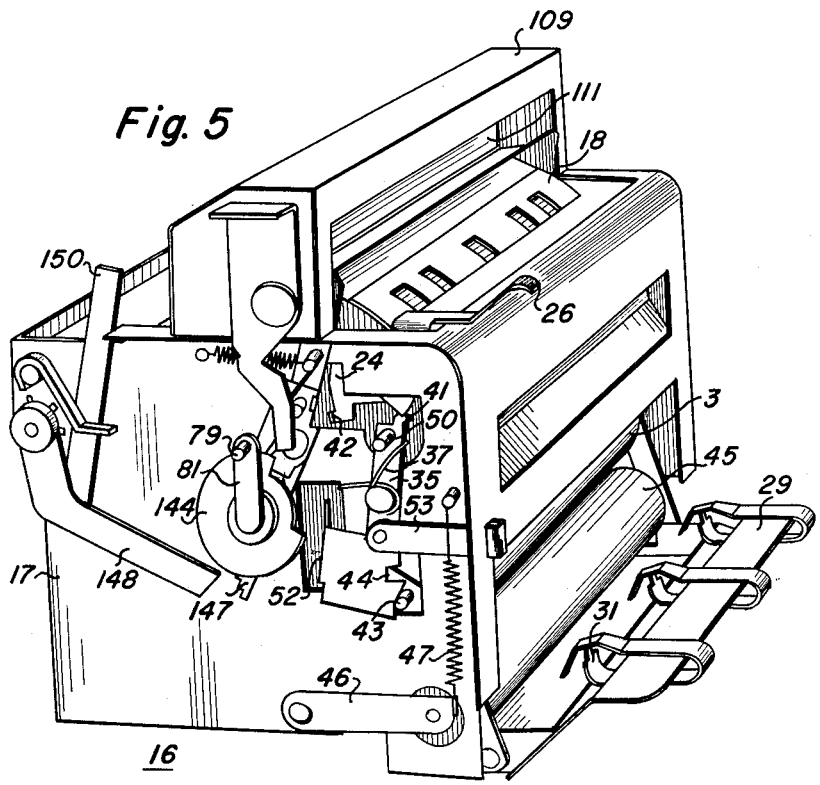
FIG. 5 is a perspective view of one of the components of the apparatus of FIG. 1 showing a matrix pick-up mechanism and a drum assembly in addition to other parts.
Figure 20:
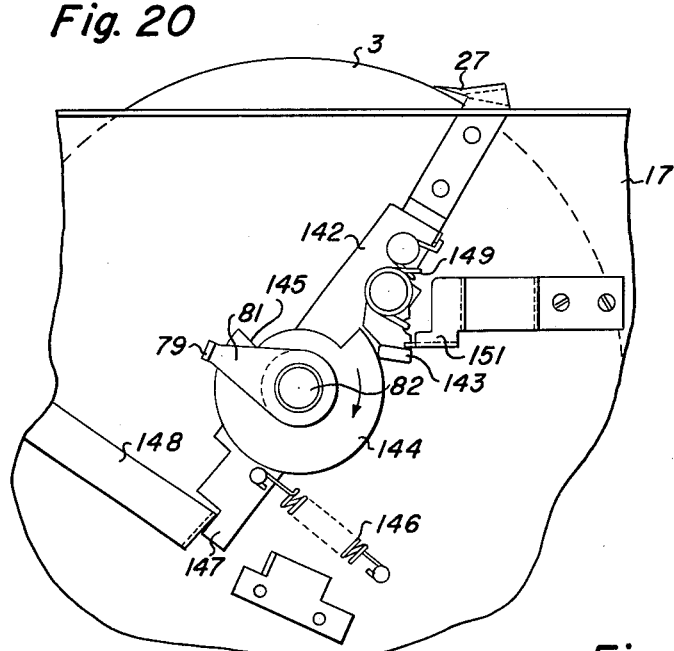
Figure 21:
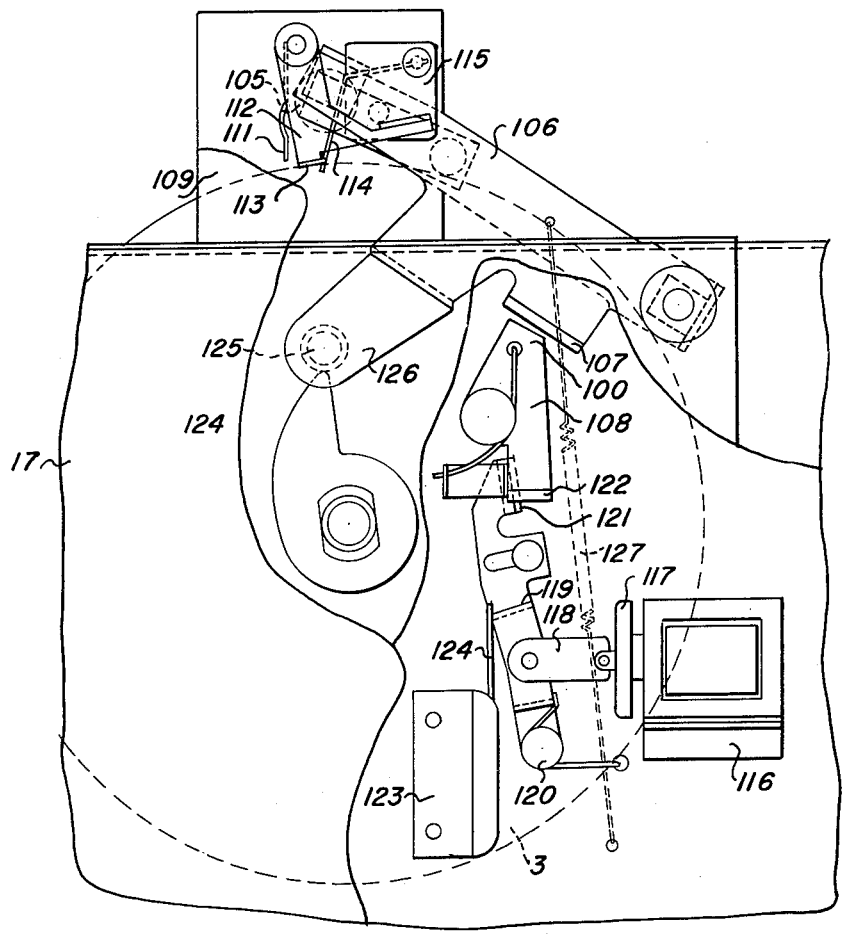

FIG. 20 is an enlarged segmental side elevation view of the component of FIG. 5 showing the mechanism for adjustably positioning the copy sheet stripper blade; and FIG. 21 is an enlarged segmental side elevation view of one side of the apparatus of FIG. 4 with a portion of the housing broken away to expose the rear end of the component of FIG. 5 in its assembled position within the housing, and further having a part of the component broken away to show the copy paper trip and pressure roller mechanisms in an inoperative position.

Figure 1:
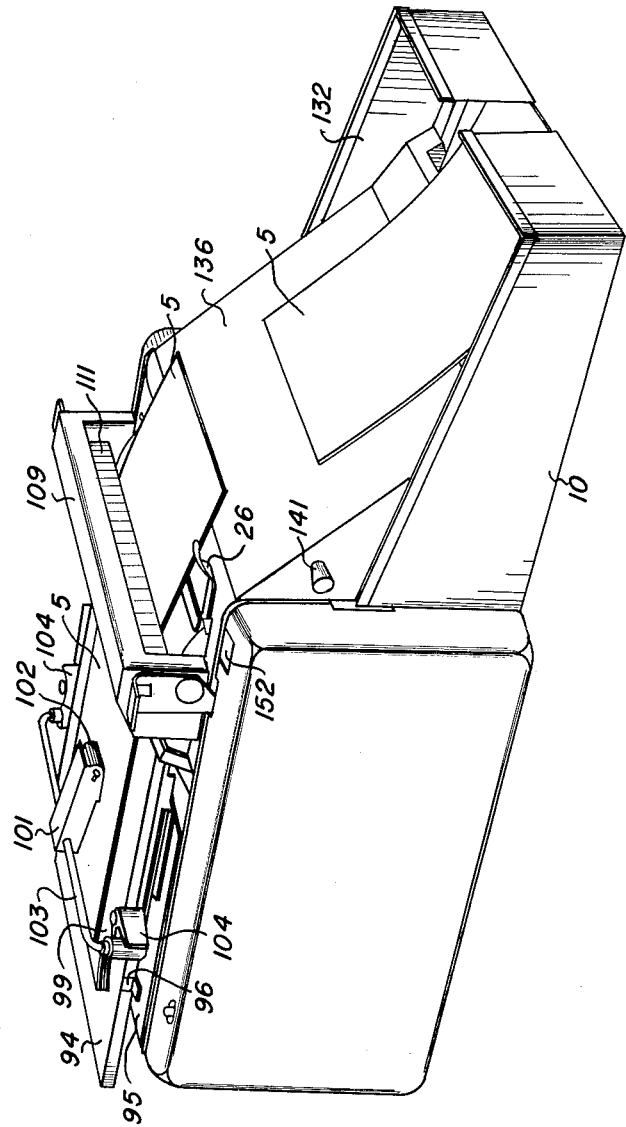
FIG. 1 is a perspective view showing (a preferred embodiment of the present invention) constructed in accordance with an improved processing and image-transfer apparatus, and showing an image-receiving sheet in the process of being discharged therefrom.
Figure 2:
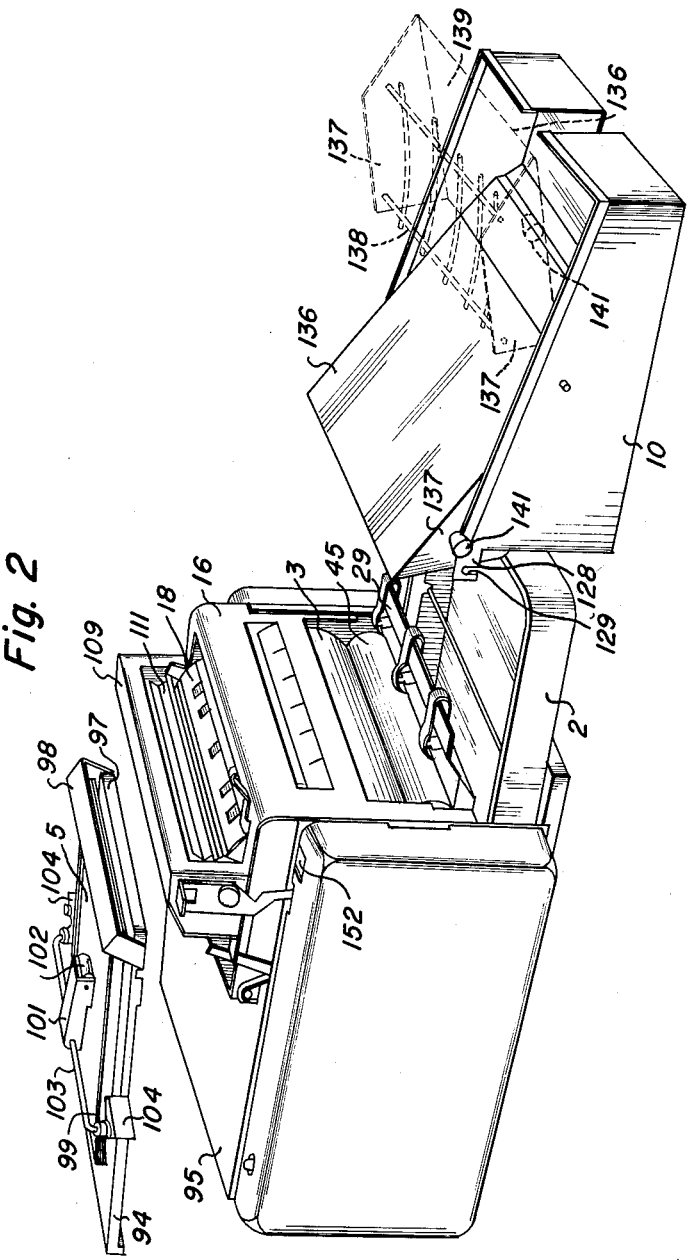
FIG. 2 is an exploded perspective view of the apparatus of FIG. 1 showing some of the components in a removed or partially removed, position.
Figure 3:
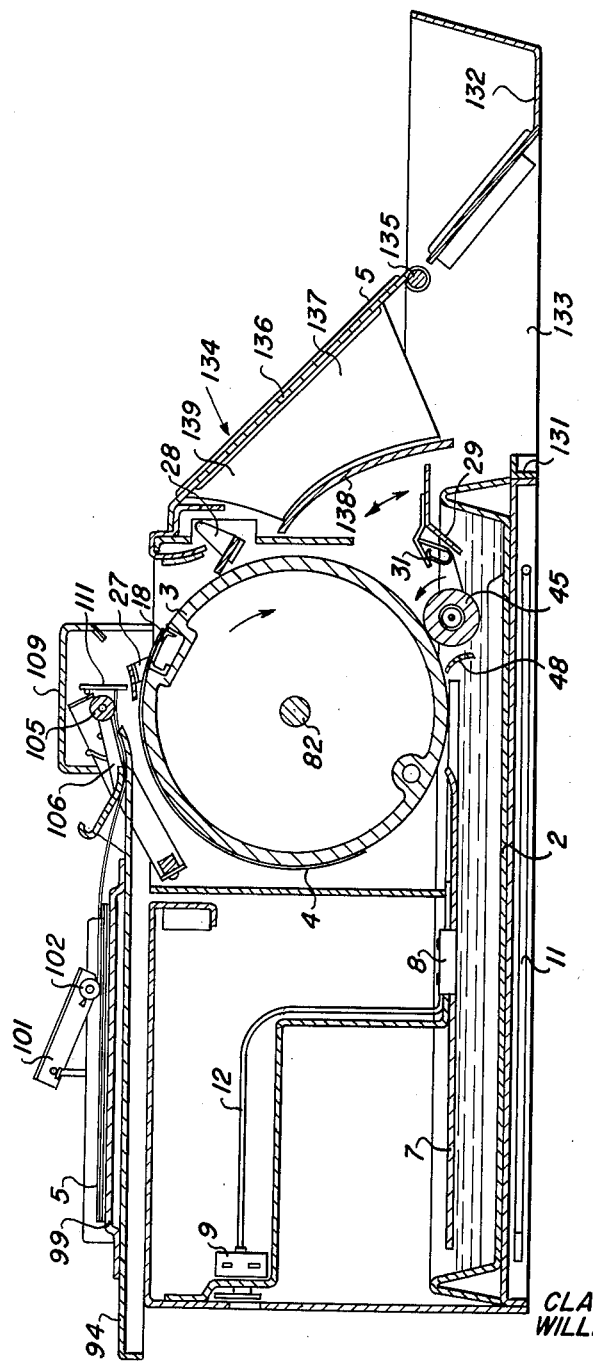
FIG. 3 is a vertical sectional view taken through the apparatus of FIG. 1, but showing the image receiving sheet in position to initiate a transfer cycle.
Figure 6:
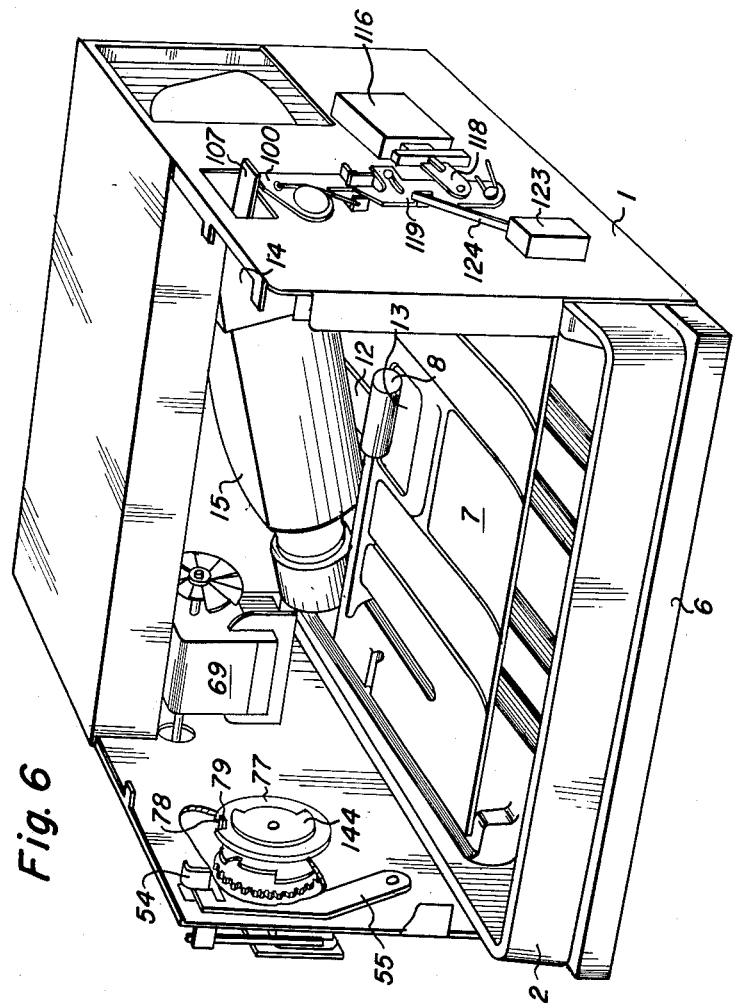
FIG. 6 is a perspective view of the main housing of the apparatus of FIG. 1 showing the activator tank and temperature control system for the solution.
Figure 14:
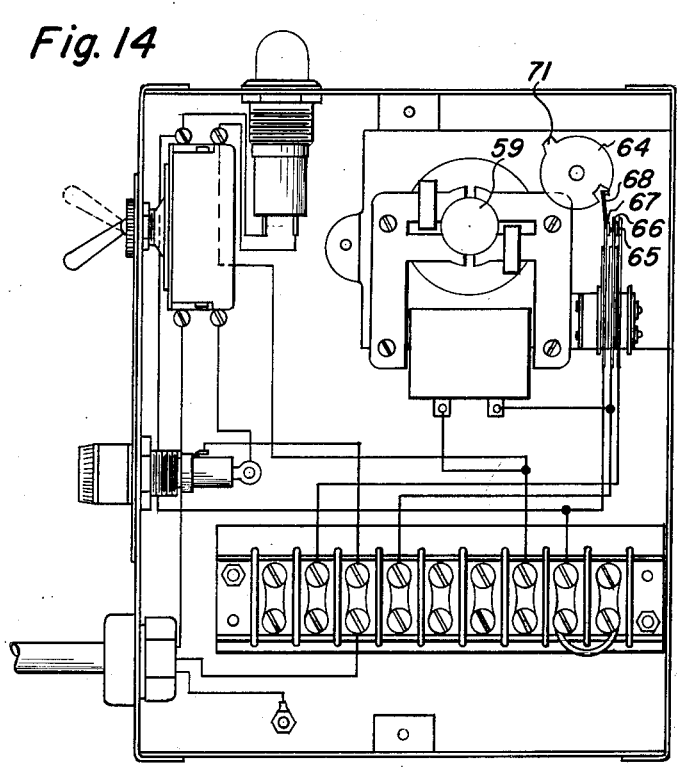
FIG. 14 is a side elevation view of the timing system for automatically timing the development period of the matrix in the solution.
Figure 15:
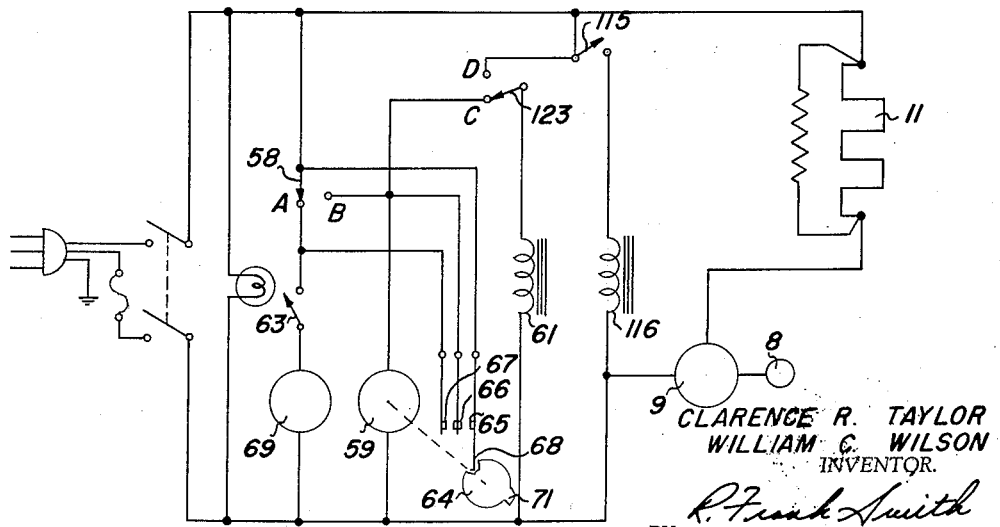
FIG. 15 is a schematic wiring diagram for the photographic copying apparatus of this invention.

A preferred embodiment of this invention is disclosed in the drawings and generally comprises a housing 1 as best seen in FIG. 6 for supporting a tray 2 provided with a processing solution, a matrix pick-up mechanism as best seen in FIGS. 7–12 including a drum 3 for removing a matrix 4 from solution and positioning it upon drum 3, a timing mechanism seen best in FIGS. 14, 15 for automatically timing the development period of the matrix 4 within the solution, a drum tripping mechanism seen in FIG. 21 actuable by a copy paper 5 as it is fed into the machine, and a discharge chute 10 shown best in FIGS. 1–3 for directing the printed copy sheets 5 into one receptacle, and the discarded matrix 4 into another receptacle.

Housing and tray

The housing 1 as best seen in FIG. 6 has a base 6 for supporting a tray 2 provided with a processing solution into which the exposed sensitized matrix 4 is inserted. The tray 2 has a cover plate 7 for preventing solution from splashing and striking various parts of the apparatus, and further forms a guide means for guiding matrix 4 into solution. A temperature control system for regulating the temperature of the solution comprises a temperature-sensitive bulb 8 connected to a thermostat 9 of any known type shown schematically in FIG. 3. The thermostat 9 controls a Calrod type heater 11 which is carried by base 6 of housing 1 underneath tray 2. Any decrease in the temperature of the solution is sensed by bulb 8, and a predetermined temperature decrease actuates thermostat 9 causing heater 11 to operate and warm up the solution. When the temperature of the solution again arrives at the predetermined value, thermostat 9 switches heater 11 off. The sensing bulb 8 is secured adjacent one end of a flexible member 12 as seen in FIGS. 3 and 6, the other end of which is secured to the rear of housing 1. The tray 2 is provided with an opening 13 for receiving bulb 8 when the end of flexible member 12 is engaged and urged downwardly by one of the machine components 16 seen in FIG. 5 as it is properly positioned in housing 1. In this position bulb 8 extends through opening 13 and is submerged in the solution. When the component 16 is withdrawn from the apparatus, a spring, not shown, urges flexible member 12 upwardly withdrawing bulb 8 clear of cover 7 so that cover 7 and tray 2 may be readily removed from housing 1 if desired. The housing 1 is further provided with a bracket 14 for holding a plastic container 15 of solution having one end projecting into the solution within tray 2 for replenishing the solution.

Matrix pick-up mechanism

Figure 7:
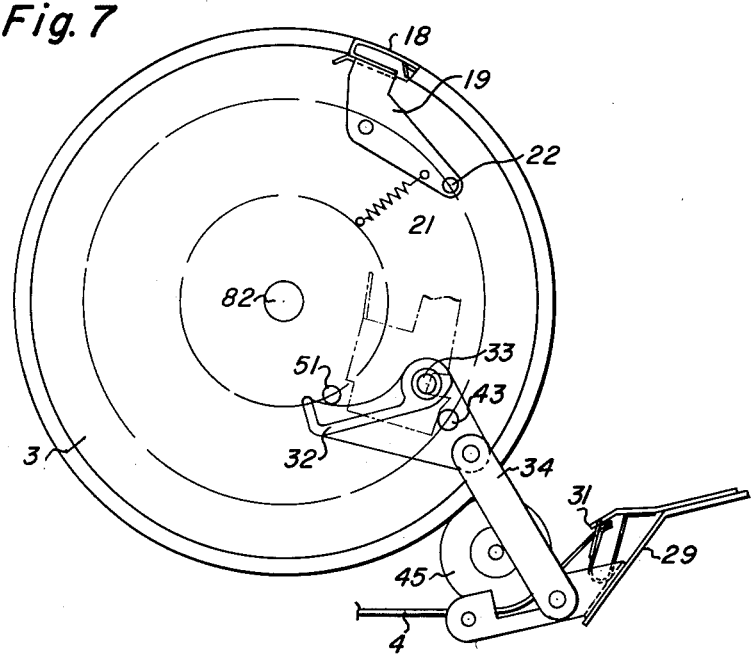
FIG. 7 is a side elevation view of the component of FIG. 5 with the side frame removed therefrom to expose the end of the drum and shows the matrix pick-up mechanism which is in an inoperative position.
Figure 8:
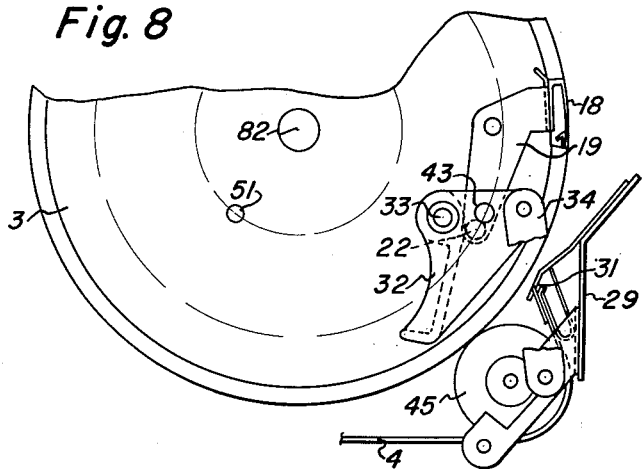
FIG. 8 is a segmental view similar to FIG. 7 showing the portion of the matrix pick-up mechanism in an operative position and the drum in a position to start opening the matrix clamp.
Figure 11:
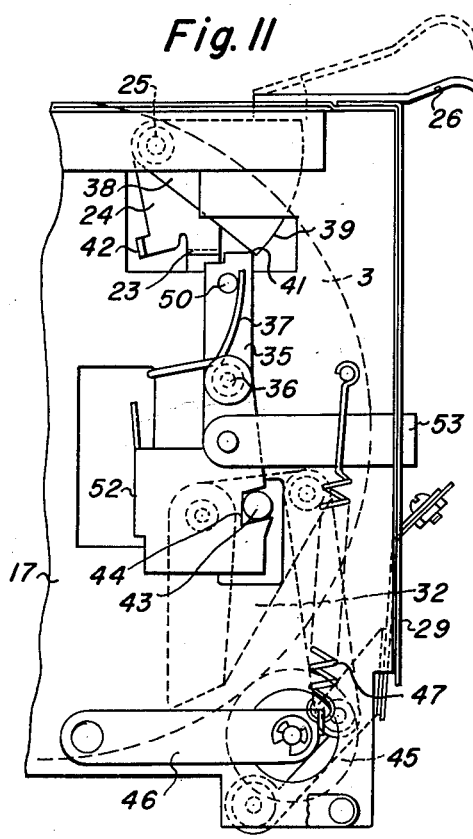
FIG. 11 is a segmental side elevation view of the component of FIG. 5 showing the clamp bracket locked in the operative position by the latch mechanism.

The matrix pick-up mechanism is incorporated in component 16 of FIG. 5 which is adapted to be slidably received and releasably secured to housing 1, seen in FIG. 2. The component 16 has frame members 17, only one of which is seen, for rotatably supporting drum 3 which has an axially extending peripheral slot for receiving a matrix clamp 18 as best seen in FIGS. 7 and 8. The clamp 18 is provided at each end with an arm 19 and is held in a closed position by springs 21 having one end secured to arm 19 and the opposite end secured to drum 3. One of the arms 19 is further provided with a projection 22 engageable by a lug 23 of a lever 24 pivotally mounted on shaft 25 as best seen in FIG. 11. The lever 24 has a handle 26 which when moved in one direction causes lug 23 to engage projection 22 and urge matrix clamp 18 into an open position. The frame members 17 further pivotally support an angularly adjustable stripping blade 27 seen in FIG. 3 for stripping copy sheet 5 off of matrix 4, and another pivotally mounted, spring-biased stripper blade 28 angularly spaced from blade 27 for stripping a released matrix 4 from drum 3.

Figure 12:
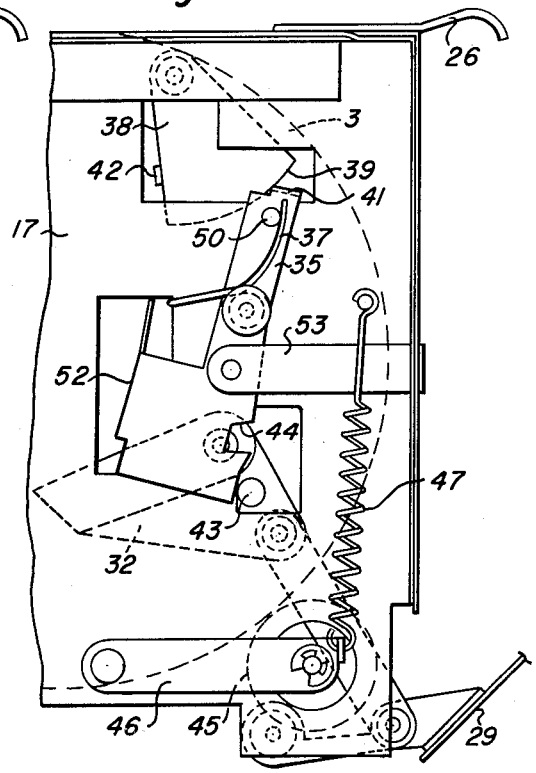
FIG. 12 is a view similar to FIG. 11 showing the latch mechanism in an inoperative position.

The matrix pick-up mechanism further has a pivotally mounted matrix clamp bracket 29 having spring grippers 31 for holding the end of a matrix 4 that has been inserted into the solution as seen best in FIGS. 7–10. A cam member 32 is pivotally supported by frame member 17 at 33 and is connected by a link 34 to clamp bracket 29 so that movement of clamp bracket 29 between operative and inoperative positions causes a corresponding movement of cam member 32. A latch as best seen in FIGS. 11 and 12 for holding clamp bracket 29 in an operative position comprises a lever 35 pivoted at 36 and biased by spring 37 in a counterclockwise direction. The latch is held in an inoperative position as seen in FIG. 12 where it is completely divorced from clamp bracket 29 by a pie-shaped plate 38 pivoted about shaft 25 and having a curved end 39 thereof engageable by a lug 41 formed by lever 35. When handle 26 and lever 24 are moved upwardly to open matrix clamp 18, a lip 42 provided by lever 24 engages an edge of plate 38 and pivotally moves it along with it. Lug 41 rides along end 39 of plate 38 until plate 38 is moved clear of lug 41 whereupon spring 37 urges the lower end of lever 35 into engagement with a pin 43 formed by cam member 32 as seen in FIG. 5. Accordingly, in addition to opening clamp 18, moving lever 24 upwardly positions the latch in an operative position where it is adapted to cooperate with clamp bracket 29. As clamp bracket 29 is moved into its operative position, pin 43 rides up along the edge of lever 35 into alignment with a notch 44 formed therein whereupon spring 37 urges lever 35 in a counterclockwise direction causing notch 44 to capture pin 43 as seen in FIG. 11. This locks the matrix clamp bracket 29 in its operative position.

Figure 9:
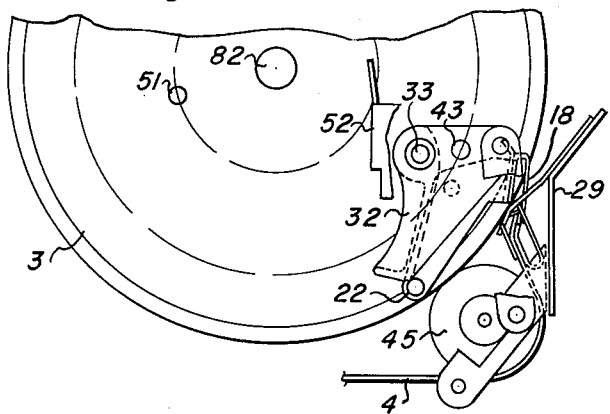
FIG. 9 is a view similar to FIGS. 7 and 8 showing the drum in a position in which the matrix clamp is wide open with a lip thereof extending over the leading edge of the matrix.
Figure 10:
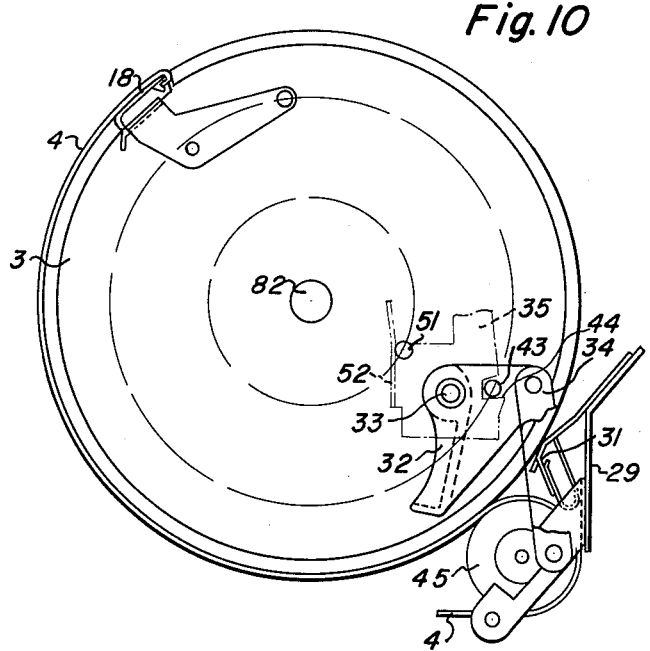
FIG. 10 is a view similar to FIGS. 7–9 showing the matrix being wrapped around the drum, and the drum in position about to release the clamp bracket.
Figure 13:
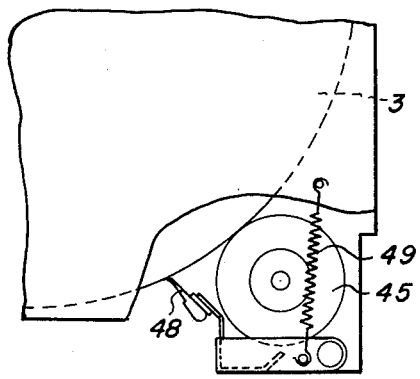
FIG. 13 is a segmental side elevation view of the component of FIG. 5 with a portion thereof broken away to show the applicator roller and squeegee.

Assuming that the clamp bracket 29 is locked in its operative position with a matrix 4 held by grippers 31, rotation of drum 3 as seen in FIGS. 8 and 9 causes projection 22 carried by matrix clamp arm 19 to strike cam 32, which upon continued rotation of drum 3, cams projection 22 and matrix clamp 18 into an open position. The leading edge of matrix 4 is so positioned by matrix clamp bracket 29 with respect to drum 3, that further rotation of drum 3 causes matrix clamp 18 to extend over the leading edge of matrix 4. Continued rotation of drum 3 causes projection 22 to ride off of cam 32 whereupon springs 21, only one of which is shown, urge matrix clamp 18 into a closed position clamping the leading edge of matrix 4 to drum 3. Further rotation of drum 3 as seen in FIG. 10 causes matrix 4 to be wrapped therearound by means of a porous, solution applicator roller 45 projecting into the solution and supported at each end, as seen in FIGS. 11 and 12 by arms 46 pivotally secured to frame members 17 and urged into engagement with drum 3 by springs 47, only one of which is shown. A squeegee blade 48 pivotally secured to the frame members 17 as seen in FIG. 13 is biased into engagement with drum 3 by spring 49 for squeegeeing the solution from matrix 4 and wiping matrix 4 onto drum 3. As drum 3 nears its original starting position, a projection 51 mounted on drum 3 strikes a flange 52 provided by latch lever 35 as best seen in FIGS. 9–12 and urges lever 35 in a clockwise direction releasing pin 43 and matrix clamp bracket 29.

Should the operator inadvertently raise lever handle 26 placing lever 35 in its operative position as seen in FIG. 5, and then move clamp bracket 29 into its operative position as seen in FIG. 11 while the copying apparatus is disconnected from the power supply or a matrix 4 is absent, a manually operated release mechanism is provided for releasing clamp bracket 29 without requiring the apparatus to go through a cycle of operation. The release mechanism comprises a lever 53 as seen in FIG. 11 connected to a lock on latch lever 35, and adapted when urged inwardly to withdraw lever 35 and notch 44 from pin 43 releasing clamp bracket 29 which is urged by its spring, not shown, and its weight into an inoperative position as seen in FIG. 12.

*Timing and drive mechanism*

When latch lever 35 is moved in a counterclockwise direction to lock matrix clamp bracket 29 in its operative position, pin 50 seen in FIGS. 5 and 11 formed by the upper portion of lever 35 engages an arm 54 of a substantially T-shaped lever 55 pivotally secured to frame member 1 as sen in FIGS, 6, 16 and 17. Another arm 56 of lever 55 urges an arm 57 of a microswitch 58, which is normally in position A as seen in FIG. 15, into position B causing a time motor 59 to operate, and a drum latch solenoid 61 seen in FIG. 16 to be energized actuating a drum latch lever 62 which closes a normally open drive motor microswitch 63. The timer motor 59 shown in FIGS. 14 and 15 drives a cam 64 which is adapted to progressively close three flexible spring contact members 65, 66 and 67 positioned adjacent cam 64. Contact member 65 has an extension forming a cam follower 68 adapted to ride on the periphery of cam 64, and to enter a peripheral recess of cam 64 disconnecting contact members 65, 66 and 67. After a period of time corresponding to the development period of matrix 4 and determined by the configuration of cam 64, contacts 65, 66 and 67 are closed by cam projection 71 electrically connecting a drive motor 69 to the power source through closed drive motor microswitch 63. After drive motor 69 has driven drum 3 through approximately one revolution, projection 51 strikes flange 52 urging lever 35 in a clockwise direction releasing pin 43 and matrix clamp bracket 29. The microswitch 58 is released by lever 35 and returned into position A disconnecting the power supply from the timer motor 59 and drum latch solenoid 61. The timer motor 59 and solenoid 61 continue to operate, however, by virtue of contacts 65 and 66 which are maintained in a closed position by timer cam 64 until cam 64 arrives at its original starting position disconnecting contacts 65, 66 and 67.

The drive motor 69 shown in FIG. 6 is any suitable type of electric motor adapted to frictionally drive a rubber-rimmed wheel 72 having a gear 73 for driving a gear train 74 as seen in FIGS. 16 and 17. A gear 75 of gear train 74 is provided with a shaft 76 having a drive wheel 77 seen best in FIG. 6 secured thereto provided with a radially extending peripheral notch 78 for receiving a lug 79 of a crank 81 as seen in FIGS. 5, 17 and 20 having one end secured to drum axle 82. Accordingly, operation of drive motor 69 causes drive wheel 77 to rotate by virtue of gear train 74 which in turn imparts rotation to drum 3.

Figure 18:
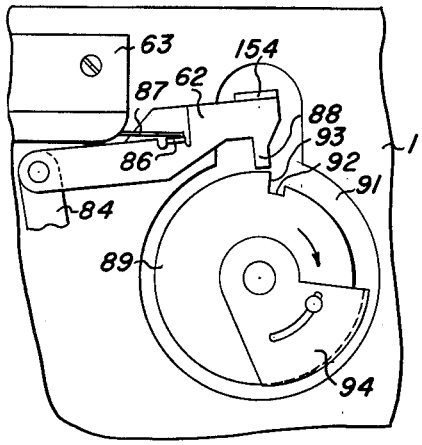
FIG. 18 is a segmental elevation view of a portion of the structure of FIG. 16 showing the drum released by the drum latch mechanism and rotated a few degrees in a clockwise direction.
Figure 19:
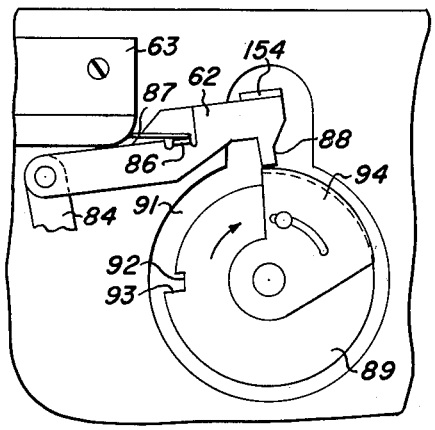
FIG. 19 is a view similar to FIG. 18 with the drum rotated through an angle of approximately 270°.

The armature 83 of drum latch solenoid 61 shown best in FIG. 16 is connected by a link 84 to lever 62 pivoted at 85 and biased by a spring, not shown, in a clockwise direction. Lever 62 has a lip 86 for engaging an arm 87 of motor drive microswitch 63, and a claw 88 adapted to cooperate with a cam disk 89 which is secured to shaft 76 and axially spaced from drive wheel 77 to form a drum latch. The disk 89, also seen in FIGS. 18 and 19, is provided with a peripheral notch 91 terminating in a recess 92 and shoulder 93. An arcuate segment 94 having the same radius as the remainder of disk 89 is adjustably secured to disk 89 by a screw and slot connection for varying the length of the notch portion 91 for a purpose to be explained hereinafter. The purpose of the drum latch is to stop drum 3 and hold it in only one position so that drum 3 is properly positioned for each cycle of operation.

In the operation of the timing system, movement of the latch lever 35 in a counterclockwise direction locking matrix clamp bracket 29 in the operative position urges microswitch 58 into position B for simultaneously actuating timer motor 59, and drum latch solenoid 61. Energization of solenoid 61 causes armature 83 to be pulled in pivoting lever 62, withdrawing claw 88 from recess 92, and closing drive motor microswitch 63. The drive motor 69 cannot operate, however, since contacts 65, 66 and 67 are not closed. The timing system remains in this position until projection 71 of timing cam 64 closes contacts 65, 66 and 67 connecting the power supply to drive motor 69 which is operated to drive drum 3. The time interval between the initial movement of microswitch 58 into position B and the operation of drive motor 69 is designed to equal the development time of the matrix 4, and is completely controlled by the speed of rotation of timer cam 64 and its configuration. As drum 3 is driven through its first revolution, pin 51 strikes flange 52 releasing pin 43 and matrix clamp bracket 29 permitting microswitch 58 to be returned by its spring to position A. The timer motor 59 and solenoid 61 are still operative, however, by virtue of closed contacts 65, 66 by cam 64. Further movement of timer cam 64 causes cam follower 68 to enter the recess in cam 64 disconnecting contacts 66, 67 and terminating the operation of timer motor 59 and solenoid 61 as drum 3 is in its second revolution. The release of solenoid 61 permits lever 62 to be urged by its spring in a clockwise direction until claw 88 engages the periphery of disk 89 which retains drive motor switch 63 in the closed position. As soon as claw 88 is urged into arcuate notch 91 as drum 3 and disk 89 are rotated further, lip 86 releases motor drive microswitch 63 which moves into its normally open position disconnecting drive motor 69 from the power supply. The drum 3 thereupon coasts along until claw 88 engages shoulder 93 of disk 89 stopping drum 3, and is urged into recess 92.

*Paper feeding and tripping mechanisms*

The paper feeding mechanism which may be of any suitable type, is shown in FIGS. 1 and 2 as a substantially rectangular frame member 94 slidably mounted on a top plate 95 of housing 1. The frame member 94 is removably secured to top plate 95 by brackets 96 to properly position frame member 94 for feeding paper into the machine. The other end of frame member 94 has a slightly upturned lip 97 against which a pivotal guide member 98 is spring biased to form an elongated narrow slit through which copy paper 5 is directed. A paper holder 99 having guide flanges for holding and guiding the copy sheets 5 is mounted on frame member 94. The device for advancing the paper 5 comprises a pivotal member 101 having a rubber roller 102 at one end for engaging the uppermost copy sheet 5, and a rod 103 supporting the other end and movable by means of handles 104 secured to a pivotal, spring-biased linkage system, not shown, to advance a copy sheet.

A tripping mechanism as best seen in FIG. 21 for simultaneously actuating drive motor 69 for driving drum 3 through one revolution, and releasing a pressure roller 105 for urging a copy sheet 5 into intimate contact with matrix 4 on drum 3 as it is rotated will now be described. The pressure roller 105 is supported by pivotal arms 106, only one of which is seen, carried by component 16. One of the arms 106 is provided with a flange 107 that cooperates with a catch means including a pivotal latch 108. When drum 3 is in its normally stopped position, the end 100 of latch lever 108 engages flange 107 and holds pressure roller 105 in an inoperative position out of contact with drum 3. A substantially inverted U-shaped frame member 109 is mounted on the upper end of component 16 and supports a pivotal tripping vane 111 disposed in the path of the leading edge of a copy sheet 5. The tripping vane 111 has an arm 112 secured thereto provided with a lug 113 in engagement with an arm 114 of a microswitch 115 also shown in FIG. 15 for actuating a pressure roller release solenoid 116. The armature 117 of solenoid 116 is connected by a link 118 to a lever 119 pivoted at 120 and having its other end 121 engaging the lower end 122 of latch 108. A microswitch 123 for controlling drum latch solenoid 61 has a movable arm 124 in engagement with pivotal lever 119 and is actuable thereby to move switch 123 from its normal position C to position D.

In the operation of the tripping mechanism, the leading edge of a copy sheet 5 advanced by the paper feed mechanism strikes pivotal vane 111 and urges it in a direction closing microswitch 115. This actuates pressure roller release solenoid 116 drawing armature 117 inwardly. This pivotally moves lever 119 and latch 108 in a direction releasing pressure roller 105, and allows microswitch 123 to move into position D energizing drum latch solenoid 61 which closes drive motor microswitch 63 through lever 62 for starting drive motor 69. The pressure roller 105 is moved by its spring into its operating position urging copy sheet 5 into intimate contact with matrix 4 as drive motor 69 rotates drum 3 through one revolution to its initial starting position. As soon as the trailing end of the copy sheet 5 passes pivotal vane 111, it returns to its initial position opening microswitch 115, de-energizing solenoid 116, permitting microswitch 123 to move to position D, de-energizing solenoid 61 and opening switch 63 to stop drive motor 69. As drum 3 approaches its initial starting position, a cam 124 carried thereby urges a finger 125 carried by a lever 126 formed by arm 106 of pressure roller 105 upwardly whereupon pivotal latch lever 108 is urged by its spring in a clockwise direction positioning its end 100 beneath flange 107 for holding pressure roller 105 in its inoperative position against the bias of its spring 127.

*Discharge mechanism*

The discharge chute 10 as shown in FIGS. 2 and 3 is provided with flanges 128 alone one end having slots 129 for receiving pins, not shown, carried by housing 1 for pivotally supporting discharge chute 10. The chute 10 is provided near its ends and along its bottom with a stop plate 131 adapted to engage the end of housing 1 for properly holding discharge chute 10 in relation to housing 1. The chute 10 is provided with a tray 132 at one end for receiving the printed copy sheets 5, and is further provided with an opening 133 located between stop plate 131 and tray 132. In addition, chute 10 has a matrix 4 and sheet guide member 134 pivotally secured thereto at 135 and provided with a flat plate 136 of rectangular shape having trapezoidal end pieces 137 secured thereto. A baffle 138 connects end pieces 137, and is spaced from plate 136 and cooperates therewith to form a passageway 139 therebetween. When it is desired to place a matrix 4 on drum 3, it is necessary to pivotally move guide member 134 by means of handle 141 into an open position as seen in FIG. 2 to permit the operator to insert matrix 4 into activator tray 2 for development and to attach the leading edge of matrix 4 to grippers 31. Once matrix 4 is on drum 3, guide member 134 is moved into a closed position as seen in FIG. 1. As drum 3 rotates with matrix 4 and copy sheet 5 in intimate contact, stripper blade 27 strips copy sheet 5 from matrix 4 and guides it over the outer surface of plate 136 into copy sheet tray 132. Stripper blade 27 is shown in FIG. 20 as being adjustable to vary the time that copy sheet 5 is in engagement with matrix 4, thereby increasing the number of copies that may be produced from a single matrix 4. This adjustable stripper blade 27 essentially comprises arm 142 pivoted on shaft 82 and having a pawl 143 engageable by a notched disk 144 carried by drum 3. Rotation of drum 3 in the direction indicated by the arrow in FIG. 20 causes shoulder 145 of disk 144 to engage pawl 143 and urge it and arm 142 in a clockwise direction against spring 146 until stepped end 147 of arm 142 strikes stop lever 148 pivotally mounted on frame member 17 as seen in FIG. 5. Stop lever 148 is movable by handle 150 to cooperate with a selected step of stepped portion 147 of arm 142. Further rotation of drum 3 causes disk 144 to cam pawl 143 in a counterclockwise direction against the bias of spring 149. The arm 146 and pawl 143 are prevented from being returned by springs 146, 149 to their original position by lock lever 151 cooperating with pawl 143.

When matrix 4 is stripped off of drum 3, matrix stripper blade 28 which is angularly displaced from copy sheet stripper blade 27 by approximately 90°, strips matrix 4 off at a lower point along drum 3 and directs it through passageway 139 and opening 133 into some suitable receptacle below.

Where the operator desires to remove an old matrix 4 from drum 3, it is necessary to operate drive motor 69 to rotate drum 3 through one revolution. It is inconvenient for the operator to close drive motor switch 63 by either tripping blade 111, by a copy sheet 5 or other instrument, or by raising lever handle 26 and clamp bracket 29 into its operative position, in which case drive motor 69 will not operate until the timing circuit completes its operation. Accordingly, a manually actuable drive motor trip lever 152 is pivotally mounted on frame 17 as seen in FIG. 16 having one end 153 in engagement with a lip 154 of drum trip lever 62 and adapted when depressed to urge lever 62 in a counterclockwise direction against the bias of its spring withdrawing claw 88 clear of disk 89 and closing drive motor switch 63.

*Operation*

In the operation of this photographic copying apparatus, let us assume initially that the machine is connected to a suitable source of electrical power and that the developing solution is at a proper operating temperature. If the operator desires to make copies of a matrix 4 that has been exposed in the normal way, it is necessary for the operator to raise setting lever 24, 26 upwardly as seen in FIG. 11 causing (1) lug 23 to engage projection 22 urging matrix clamp 18 into an open position releasing the old matrix 4 that is on drum 3, and (2) lip 42 to engage and move plate 38 releasing latch lever 35 which is urged by spring 37 into its operative position as seen in FIG. 5. The operator then inserts the exposed new matrix 4 into activator tray 2 and fastens its leading edge to grippers 31 as seen in FIG. 7. The operator then manually raises matrix clamp bracket 29 into its operative or matrix pick-up position where it is locked by latch lever 35 as seen in FIG. 11. As the matrix clamp bracket 29 is moved into the pick-up position, lip 41 of lever 35 pivots lever 55 whose arm 56 closes microswitch 58 to start timer motor 59, and energize solenoid 61 pivoting lever 62 to close switch 63 and withdraw claw 88 from recess 92 completely clear of disk 89 as that drum 3 is free to rotate (see FIGS. 6, 11 and 16.) The timer motor 59 rotates timer cam 64, see FIGS. 14, 15, whose projection 71, after a predetermined time interval corresponding to the development time of matrix, closes contacts 65, 66 and 67 to actuate drum drive motor 69 through closed switch 63. The drive motor 69 begins to rotate drum 3 through gear train 74 and drive wheel 77 as seen in FIGS. 16, 17, and as the released leading edge of the old matrix 4 strikes matrix stripper blade 28, it is stripped from drum 3 and is discharged through passageway 139 and opening 133 of discharge chute 10, see FIG. 3, into a receptacle, not shown. Further rotation of drum 3 causes projection 22 of matrix clamp 18 to ride on cam 32 which urges matrix clamp 18 into an open position as seen in FIGS. 8 and 9. While in this position, the leading edge of the matrix 4 held by grippers 31 is positioned between drum 3 and open matrix clamp 18. Continued rotation of drum 3 causes projection 22 to drop off of cam 32 closing matrix clamp 18 and capturing the leading edge of the matrix 4 therebetween. Still further rotation of drum 3 draws matrix 4 around roller 45 and through squeegee blade 48 where matrix 4 is squeegeed and wiped upon drum 3. As drum 3 nears the end of its first revolution of rotation as seen in FIG. 10, a pin 51 carried thereby cams flange 52 of lever 35 in a clockwise direction against the bias of spring 37 releasing pin 43 and matrix clamp bracket 29 permitting microswitch 58 to return to position A. Solenoid 61 and timer motor 59 continuing to operate by virtue of closed contacts 65, 66, see FIG. 15, until cam follower 68 bottoms in the recess of cam 64 opening contacts 65, 66 stopping timer motor 59 and de-energizing solenoid 61. Although solenoid 61 is de-energized, drive motor microswitch 63 is retained in its closed position by lever 62 whose claw 88 is riding on the periphery of disk 89 as seen in FIGS. 18 and 19. After drum 3 has completed about three-fourths of its second revolution, claw 88 is urged by its spring into notch 91 causing lip 86 to release drive motor microswitch 63 which is urged by its spring into its normally open position stopping drive motor 69. Drum 3 continues to coast due to its inertia and is stopped by claw 88 engaging disk shoulder 93. The claw 88 is then urged into recess 92 to lock drum 3 in its original starting position as seen in FIG. 16. The apparatus is at this time in a copy-making position with the new matrix 4 positioned on drum 3.

To make copies from matrix 4, the operator manually moves paper feed mechanism by handle 104 advancing a copy sheet 5 into engagement with tripping vane 111 as seen in FIG. 3. Further advance of copy sheet 5 causes its leading edge to pivotally move tripping vane 111 closing normally open microswitch 115 energizing solenoid 116 as seen in FIG. 21. Solenoid 116 draws in armature 117 pivotally moving lever 119 to substantially simultaneously (1) pivot lever 108 releasing pressure roller 105 which is urged by its spring 127 into engagement with drum 3, and (2) release arm 124 of drum latch microswitch 123 which is moved by its spring into position C energizing drum latch lever solenoid 61 which pivots lever 62 withdrawing its claw 88 clear of the periphery of disk 89 and closing drive motor microswitch 63 to operate drive motor 69 (see FIGS. 15, 16). Drum 3, as it rotates, draws copy sheet 5 therealong which is urged into intimate contact with matrix 4 by pressure roller 105. The vane 111 is so positioned with respect to drum 3 in its starting position that copy sheet 5 properly registers with matrix 4 eliminating the need for any tab on the copy sheet. After drum 3 has rotated through an angle of several degrees, copy sheet stripper plate 27 strips copy sheet 5 from matrix 4 and directs it over plate 136 into copy sheet receiving tray 132, as seen in FIGS. 1 and 3. When the trailing end of copy sheet 5 passes by plate 111, the plate is returned by its spring to its original position opening microswitch 115 and de-energizing solenoid 116. This causes levers 108, 119 to assume their original positions, and microswitch 123 to return to position C de-energizing solenoid 61. Although solenoid 61 is de-energized, drive motor switch 63 is the closed position by virtue of claw 88 riding on the periphery of disk 89, see FIGS. 15, 16. As drum 3 continues to be driven by motor 69, matrix 4 is brought into contact with solution applicator roller 45 for re-wetting matrix 4 with the solution. Further rotation of drum 3 causes matrix 4 to pass squeegee blade 48 which squeegees the solution off of matrix 4. As drum 3 nears the end of its revolution, cam 124 urges finger 125, arm 106 and pressure roller 105 upwardly permitting latch lever 108 to be biased by its spring into a latching position with its end 100 engaging flange 107, and preventing pressure roller 105 from being urged downwardly by its spring 127. See FIG. 21. Also, claw 88 drops into arcuate notch 91 releasing drive motor microswitch 63 which returns to its normally open position stopping drive motor 69. The drum 3 then coasts into its original starting position with shoulder 93 engaging claw 88 which is urged by its spring into recess 92. If the operator desires to make further copies of matrix 4, it is merely necessary to repeat the procedure followed in making the first copy sheet. If the operator desires to remove matrix 4 from drum 3 after he has made a sufficient number of copies thereof, he merely has to manually raise setting lever 24, 26 as indicated earlier opening matrix clamp 18 and permitting the leading edge of matrix 4 to move clear of clamp 18 by virtue of its own resiliency. After releasing lever 24, 26, the operator depresses lever 152 as seen in FIG. 16 which manually urged drum latch lever 62 against the bias of its spring until claw 88 is withdrawn clear of disk 89 and drive motor microswitch 63 is closed. This starts drive motor 69 which rotates drum 3 through one revolution. As drum 3 is rotating, matrix stripper blade 28 strips matrix 4 off of drum 3 and directs it through passageway 139 and opening 133 (see FIG. 3) into a receptacle, not shown.

The invention has been described in detail with particular reference to preferred embodiments thereof, but it will be understood that variations and modifications can be effected within the spirit and scope of the invention as described hereinabove and as defined in the appended claims.

We claim:

1. In a copying apparatus for transferring an image from a developed sheet to an image-receiving sheet when the two are fed into face to face contact, the combination comprising a processing fluid container into which an exposed sensitized sheet is adapted to be inserted for development; a rotatable drum adjacent said container; drive means for rotating said drum through a predetermined loading cycle and a transfer cycle in succession; means for stopping said drum after said loading cycle is completed; means for removing said developed sensitized sheet from said container and wrapping it around the periphery of said drum during said loading cycle; pressing means adjacent said drum and movable from a normally inoperative position to an operative position for pressing into intimate face to face contact with said sensitized sheet carried by said drum an image-receiving sheet adapted to be fed thereto in superposed relation; and control means actuable by the image-receiving sheet being fed onto said drum to substantially simultaneously cause said pressing means to move to its operative position and said drive means to rotate said drum through said transfer cycle during which said image-receiving sheet is pressed into face to face intimate contact with said sensitized sheet.

2. The invention according to claim 1 wherein said stopping means for said drum comprises a disk carried by said drum, and a latch associated with said drive means and adapted to cooperate with said disk.

3. The invention according to claim 2 wherein said disk has an arcuate peripheral notch terminating in a shoulder; and said latch comprises a pivotal lever biased by a spring into engagement with the periphery of said disk, and a solenoid adapted to move said lever against the bias of its spring.

4. The invention according to claim 3 wherein said lever has a claw adapted to cooperate with said notched portion of said disk, said lever further having a portion thereof adapted to actuate said drive means switch for stopping said drive motor when said claw enters said notched portion whereupon said drum coasts until said claw engages said shoulder to stop said drum.

5. The invention according to claim 1 wherein said pressing means comprises a pressure roller biased by a spring toward said operative position; and said control means comprises a catch means movable between a first position out of engagement with said roller and a second position in engagement with said roller for releasably holding said roller in said inoperative position, and tripping means for controlling said catch means and adapted when actuated by an image-receiving sheet being fed to substantially simultaneously move said catch means into said first position permitting said roller to move into its operative position, and release said drum stopping means and actuate said drive means to drive said drum through a transfer cycle.

6. The invention according to claim 5 wherein said catch means comprises a pivotal lever biased by a spring into said second position, and said tripping means comprises a pivotal vane actuable by an image-forming sheet being fed, a solenoid actuable by said vane upon pivotal movement thereof, and a pivotal arm controlled by said solenoid and having one end thereof in engagement with said pivotal lever, and another portion of said arm adapted to release said drum stopping means and actuate said drive means.

7. The invention according to claim 1 wherein said drive means is provided with a first switch; said stopping means for said drum comprises a disk carried by said drum and having an arcuate peripheral notch terminating in a shoulder, a first pivotal lever for controlling said first switch and having a claw at one end biased by a spring into engagement with the periphery of said disk, and a first solenoid for controlling said lever; said pressing means comprises a pressure roller biased by a spring toward said operative position; and said control means comprises a second pivotal lever movable between a first position out of engagement with said roller and a second position in engagement with said roller for releasably holding said roller in said inoperative position, a pivotal vane movable by an image-receiving sheet being fed, a second switch actuable by said vane upon pivotal movement thereof, a second solenoid controlled by said second switch, and a pivotal arm controlled by said second solenoid and having one end of said arm adapted to engage and move said second pivotal lever into its first position releasing said roller, and another portion of said arm adapted to actuate said first solenoid pivoting said first lever withdrawing said lug from said disc to release said drum, and actuating said first switch to operate said drive means.

8. In a copying apparatus for transferring an image from a developed sheet to an image-receiving sheet, the combination comprising: a processing fluid container into which an exposed sensitized sheet is adapted to be inserted for development; a rotatable drum adjacent said container; drive means for rotating said drum; timing means adapted to initiate operation of said drive means for rotating said drum through a loading cycle a predetermined time interval after said timing means is actuated, said predetermined time interval substantially corresponding to the development period of said sensitized sheet; means for stopping said drum after said loading cycle is completed; gripping means movable between operative and inoperative positions and adapted to releasably hold one end of said sensitized sheet in said container, said gripping means further adapted to actuate said timing means when moved into said operative position; means for removing said developed sensitized sheet from said container and wrapping it around the periphery of said drum during said loading cycle; pressing means adjacent said drum and movable from a normally inoperative position to an operative position for pressing an image-receiving sheet fed to said drum into intimate face to face contact with said sensitized sheet carried by said drum; actuating means for initiating operation of said drive means for rotating said drum through a transfer cycle; and control means actuable by the image-receiving sheet being fed to substantially simultaneously cause said pressing means to move to its operative position, and said actuating means to initiate operation of said drive means for rotating said drum through said transfer cycle.

9. The invention according to claim 8 wherein said stopping means for said drum comprises a disk carried by said drum, and a latch associated with said drive means and adapted to cooperate with said disk.

10. The invention according to claim 9 wherein said disk has an arcuate peripheral notch terminating in a shoulder; and said latch comprises a pivotal lever biased by a spring into engagement with the periphery of said disk, and a solenoid adapted to move said lever against the bias of its spring.

11. The invention according to claim 10 wherein said lever has a claw adapted to cooperate with said notched portion of said disk, said lever further having a portion thereof adapted to actuate said drive means switch for stopping said drive motor when said claw enters said notched portion whereupon said drum coasts until said claw engages said shoulder to stop said drum.

12. The invention according to claim 8 wherein said pressing means comprises a pressure roller biased by a spring toward said operative position; and said control means comprises a catch means movable between a first position out of engagement with said roller and a second position in engagement with said roller for releasably holding said roller in said inoperative position, and tripping means for controlling said catch means and adapted when actuated by a sheet being fed to substantially simultaneously move said catch means into said first position permitting said roller to move into its operative position, and release said drum stopping means and actuate said drive means to drive said drum through a transfer cycle.

13. The invention according to claim 12 wherein said catch means comprises a pivotal lever biased by a spring into said second position, and said tripping means comprises a pivotal vane actuable by an image-receiving sheet being fed, a solenoid actuable by said vane upon pivotal movement thereof, and a pivotal arm controlled by said solenoid and having one end thereof in engagement with said pivotal lever, and another portion of said arm adapted to release said drum stopping means and actuate said drive means.

14. The invention according to claim 8 wherein said drive means is provided with a first switch; said stopping means for said drum comprises a disk carried by said drum and having an arcuate peripheral notch terminating in a shoulder, a first pivotal lever for controlling said first switch and having a claw at one end biased by a spring into engagement with the periphery of said disk, and a first solenoid for controlling said lever; said pressing means comprises a pressure roller biased by a spring toward said operative position; and said control means comprises a second pivotal lever movable between a first position out of engagement with said roller and a second position in engagement with said roller for releasably holding said roller in said inoperative position, a pivotal vane movable by an image-receiving sheet being fed, a second switch actuable by said vane upon pivotal movement thereof, a second solenoid controlled by said second switch, and a pivotal arm controlled by said second solenoid and having one end of said arm adapted to engage and move said second pivotal lever into its first position releasing said roller, and another portion of said arm adapted to actuate said first solenoid pivoting said first lever withdrawing said claw from said disk to release said drum, and actuating said first switch to operate said drive means.

15. The invention according to claim 8 wherein said timing means comprises a timing motor, a rotatable cam driven by said motor, and contact means associated with said timing motor and said stopping means and controlled by said cam for controlling the duration of operation of said timing motor and said stopping means.

16. The invention according to claim 8 wherein said gripping means comprises a pivotal plate having grippers for releasably holding one end of said sensitized sheet, a movable cam, and a linkage connecting said plate to said cam and adapted when said plate is moved into said operative position to dispose said cam in a position to cooperate with said film removing means.

17. The invention according to claim 8 wherein said stopping means comprises a disk carried by said drum, a latch associated with said drive means and adapted to cooperate with said disk, and a solenoid for controlling said latch; said timing means comprises a timing motor, a rotatable cam driven by said motor, and contact means associated with said timing motor and said stopping means and controlled by said cam for controlling the direction of operation of said timing motor and energization of said solenoid; switch means for connecting said timing motor and said solenoid to a power supply; and said gripping means comprises a pivotal plate having grippers for releasably holding one end of said sensitized sheet, a movable cam, and a linkage connecting said plate to said cam and adapted when said plate is moved into said operative position to dispose said cam in a position to cooperate with said sensitized sheet removing means, and lock means for releasably locking said gripping means in said operative position and adapted in said locked position to actuate said switch means to initiate operation of said timing motor and energization of said solenoid.

18. The invention according to claim 17 wherein said lock means comprises a pivotal arm biased by a spring into engagement with a pin carried by said linkage, said arm having a slot adapted to receive said pin to lock said gripping means when moved into said operative position.

19. In a processing and image transfer apparatus having a processing fluid container into which an exposed sensitized sheet is adapted to be inserted for development, a rotatable drum adjacent said container, and a supply of image-receiving sheets adjacent the periphery of said drum, the combination comprising: drive means for rotating said drum; a first switch for said drive means and movable from a normally open position to a closed position; a disk carried by said drum; a latch associated with said disk and adapted in one position to close said first switch, and in another position to open said switch and stop said drum after it has completed a loading cycle; a first solenoid for controlling said latch; a timing motor; a rotatable cam driven by said motor; contact means associated with said timing motor and said first solenoid and controlled by said cam for initiating operation of said drive means for rotating said drum through said loading cycle, and for controlling the duration of operation of said timing motor and energization of said first solenoid; a pivotal plate movable between operative and inoperative positions and having grippers for releasably holding one end of said sensitized sheet; a movable cam; a linkage connecting said plate to said cam and carrying a pin; a pivotal arm biased into engagement with said pin and having a slot adapted to receive said pin to lock said plate in its operative position; a second switch for electrically connecting said timing motor and said first solenoid to a power supply and actuable by said arm in its locked position to initiate operation of said timing motor and energization of said first solenoid; means associated with said cam for removing said developed sensitized sheet from said container and wrapping it around the periphery of said drum during said loading cycle; means adjacent the drum for successively feeding said image-receiving sheets from said supply to said drum; a pressure roller movable from a normally inoperative position to an operative position in which said image-receiving sheet is pressed into intimate face to face contact with said sensitized sheet carried by said drum; a catch including a spring biased pivotal lever movable between a first position out of engagement with said roller and a second position in engagement with said roller for releasably holding said roller in said inoperative position; a third switch associated with said first solenoid and adapted in a normally maintained first position to electrically connect said second switch to said first solenoid, and in a second position to connect said first solenoid directly to the power supply for initiating operation of said drive means for rotating said drum through a transfer cycle; a second solenoid connected to said catch and said third switch and adapted when energized to move said catch into its first position and said third switch into its second position; a pivotal vane actuable by each of said image-receiving sheets being fed to said drum; and a fourth switch controlling said second solenoid and movable by said vane from a normally open position to a closed position for energizing said second solenoid to substantially simultaneously cause said roller to move to its operative position, and said drive means to rotate said drum through said transfer cycle.

20. The invention according to claim 19 wherein said pivotal arm has a flange, and said drum is provided with a projection adapted upon rotation of said drum to cam said flange and arm in a direction releasing said pin whereby said plate is moved into its inoperative position.

21. In a copying apparatus for transferring an image from a matrix to a copy sheet when the two are fed into face to face contact, the combination comprising: a rotatable drum; drive means for rotating said drum through a predetermined loading cycle and a transfer cycle in succession; means for stopping said drum after said loading cycle is completed; means for picking up a matrix and wrapping it around the periphery of said drum during said loading cycle; pressing means adjacent said drum and movable from a normally inoperative position to an operative position for pressing a copy sheet fed onto the drum into intimate face to face contact with said matrix carried by said drum; and control means actuable by the copy sheet being fed onto said drum to substantially simultaneously cause said pressing means to move to its operative position and said drive means to rotate said drum through said transfer cycle during which said copy sheet is pressed into face to face intimate contact with said matrix.

References Cited in the file of this patent

UNITED STATES PATENTS

| | | |
|---|---|---|
| 2,144,076 | Morrison | Jan. 17, 1939 |
| 2,572,450 | Crissy | Oct. 23, 1951 |
| 2,903,965 | Eichenbaum et al. | Sept. 15, 1959 |
| 2,919,640 | Ritzerfeld | Jan. 5, 1960 |

FOREIGN PATENTS

| | | |
|---|---|---|
| 750,760 | Great Britain | June 20, 1956 |